(12) United States Patent
Huang

(10) Patent No.: US 12,315,244 B2
(45) Date of Patent: May 27, 2025

(54) TARGET STATE ESTIMATION METHOD AND APPARATUS, AND UNMANNED AERIAL VEHICLE

(71) Applicant: AUTEL ROBOTICS CO., LTD., Guangdong (CN)

(72) Inventor: Jinxin Huang, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 431 days.

(21) Appl. No.: 17/654,514

(22) Filed: Mar. 11, 2022

(65) Prior Publication Data

US 2022/0198793 A1 Jun. 23, 2022

Related U.S. Application Data

(63) Continuation of application No. PCT/CN2020/113989, filed on Sep. 8, 2020.

(30) Foreign Application Priority Data

Sep. 11, 2019 (CN) .......................... 201910859837.4

(51) Int. Cl.
*G06V 20/17* (2022.01)
*G06T 7/50* (2017.01)
(Continued)

(52) U.S. Cl.
CPC ................ *G06V 20/17* (2022.01); *G06T 7/50* (2017.01); *G06T 7/73* (2017.01); *G06V 10/245* (2022.01);
(Continued)

(58) Field of Classification Search
CPC .... G06V 20/17; G06V 10/245; G06V 20/647; G06V 20/58; G06T 7/50; G06T 7/73;
(Continued)

(56) References Cited

U.S. PATENT DOCUMENTS 9,025,825 B2 * 5/2015 Saund .................... G06T 7/246
382/103
9,483,839 B1 * 11/2016 Kwon ..................... H04N 5/33
(Continued)

FOREIGN PATENT DOCUMENTS

CN 105652891 A 6/2016
CN 107192330 A 9/2017
(Continued)

OTHER PUBLICATIONS

PCT/CN2020/113889 International Search Report (with English translation).

*Primary Examiner* — Matthew C Bella
*Assistant Examiner* — Andrew B. Jones
(74) *Attorney, Agent, or Firm* — Frank Gao, Esq.

(57) ABSTRACT

The method includes: obtaining a target image acquired by the camera apparatus, and performing image recognition on the target image, to obtain a target image region of a target in the target image; obtaining a raw point cloud of a surrounding environment of the UAV, and obtaining a first target location according to the target image region and the raw point cloud; obtaining attitude information of the camera apparatus, obtaining a first image location based on the target image region, and obtaining a second target location according to the first image location and the attitude information; obtaining a second image location based on the target image region; initializing a target state according to the first target location or the second target location; and using the first target location and/or the second target or image location as measured values of an extended Kalman filter to obtain the target state.

18 Claims, 6 Drawing Sheets

(51) Int. Cl.
*G06T 7/73* (2017.01)
*G06V 10/24* (2022.01)
*G06V 20/64* (2022.01)

(52) U.S. Cl.
CPC .. *G06V 20/647* (2022.01); *G06T 2207/10028* (2013.01); *G06T 2207/10032* (2013.01); *G06T 2207/30244* (2013.01)

(58) Field of Classification Search
CPC . G06T 2207/10028; G06T 2207/10032; G06T 2207/30244; G06T 2207/10016; G06T 2207/20072; G06T 2207/20081; G06T 2207/20104; G06T 7/277; G06T 7/579; G06T 7/74; G06T 7/70; G06T 2207/30252; G06T 2207/30261; Y02T 10/40
See application file for complete search history.

(56) References Cited

U.S. PATENT DOCUMENTS

2017/0123425 A1\* 5/2017 Zhao .................... B64C 39/024
2018/0101173 A1\* 4/2018 Banerjee .................. G06T 7/70
2022/0130145 A1\* 4/2022 Connary ................ G06T 15/20

FOREIGN PATENT DOCUMENTS

| CN | 108713179 A | 10/2018 |
| CN | 109754420 A | 5/2019 |
| CN | 109767452 A | 5/2019 |
| CN | 110222581 A | 9/2019 |
| CN | 110570463 A | 12/2019 |
| EP | 1868008 A1 | 12/2007 |
| WO | WO-2020186678 A1 \* | 9/2020 |

\* cited by examiner

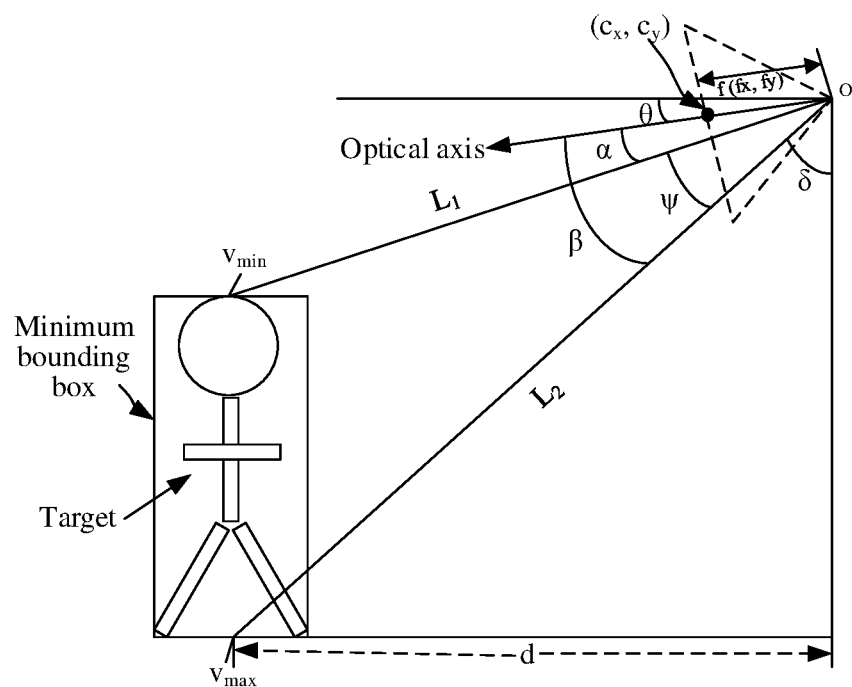

FIG. 5

Obtain the pitch angle of the camera apparatus, and if the pitch angle is less than or equal to a preset angle threshold, obtain the first image location based on the target image region, and obtaining the second target location according to the first image location, the pitch angle, and a geometric relationship between the target and the camera apparatus — 1031

FIG. 6

Obtain the second image location based on the target image region if a ratio of a size of the target image region to a size of the target image is greater than or equal to a preset ratio threshold — 1041

FIG. 7

TARGET STATE ESTIMATION METHOD AND APPARATUS, AND UNMANNED AERIAL VEHICLE

CROSS-REFERENCE TO RELATED APPLICATIONS

The present application is a continuation of International Application No. PCT/CN2020/113989, filed Sep. 8, 2020, which claims priority to and the benefit of Chinese Patent Application No. 201910859837.4, filed Sep. 11, 2019, the entireties of which are hereby incorporated herein by reference.

TECHNICAL FIELD

The present application relates to the field of unmanned aerial vehicle (UAV) technologies, and in particular, to a target state estimation method and apparatus, and a UAV.

BACKGROUND

UAVs have been widely used to track moving targets. When a UAV is used to track a target, it is necessary to plan an appropriate path according to a location of the target, and avoid an obstacle while keeping track. Therefore, in the process of tracking the target by the UAV, it is crucial to obtain a precise state of the target.

At present, the most used method is to assume that the ground is a plane and that a height of the UAV relative to the ground is a height of the UAV relative to the target, obtain the height relative to the ground through a flight control module or other modules, and estimate a target state using a specific geometric relationship under the foregoing assumptions.

In the process of implementing the present invention, it is found by the inventor that the foregoing method has at least the following problems: In a scenario in which the UAV is not above the ground (such as hills and stairs), the assumptions are not met, and the height relative to the ground obtained by the UAV has errors. As a result, the precision of the target state estimation relying on the height relative to the ground is relatively poor.

SUMMARY

An objective of embodiments of the present invention is to provide a target state estimation method and apparatus, and a UAV with high precision.

According to a first aspect, an embodiment of the present invention provides a target state estimation method, applicable to a UAV. The UAV includes a camera apparatus. The method includes:

obtaining a target image acquired by the camera apparatus, and performing image recognition on the target image, to obtain a target image region of a target in the target image;

obtaining a raw point cloud of a surrounding environment of the UAV, and obtaining a first target location according to the target image region and the raw point cloud;

obtaining attitude information of the camera apparatus, obtaining a first image location based on the target image region, and obtaining a second target location according to the first image location and the attitude information;

obtaining a second image location based on the target image region;

initializing a target state according to the first target location or the second target location; and using the first target location and/or the second target location and/or the second image location as measured values of an extended Kalman filter to obtain the target state, the target image being a two-dimensional image, and the first image location and the second image location being both locational representations of the target image region in the target image.

According to a second aspect, an embodiment of the present invention provides a target state estimation method, applicable to a UAV. The UAV includes a camera apparatus. The method includes:

obtaining a target image acquired by the camera apparatus, and performing image recognition on the target image, to obtain a target image region of a target in the target image;

obtaining attitude information of the camera apparatus, obtaining a first image location based on the target image region, and obtaining a second target location according to the first image location and the attitude information;

obtaining a second image location based on the target image region;

initializing a target state according to the second target location; and using the second target location and/or the second image location as measured values of an extended Kalman filter to obtain the target state, the target image being a two-dimensional image, and the first image location and the second image location being both locational representations of the target image region in the target image.

In some embodiments, the obtaining a first target location according to the target image region and the raw point cloud includes:

converting the raw point cloud to an image coordinate system where the target image is located, to obtain an image point cloud corresponding to the raw point cloud; and determining whether there is an image point cloud corresponding to the target, the image point cloud corresponding to the target being an image point cloud located in the target image region, and if there is an image point cloud corresponding to the target, obtaining the first target location according to the image point cloud corresponding to the target.

In some embodiments, the attitude information is a pitch angle of the camera apparatus; and the obtaining attitude information of the camera apparatus, obtaining a first image location based on the target image region, and obtaining a second target location according to the first image location and the attitude information includes:

obtaining the pitch angle of the camera apparatus, and if the pitch angle is less than or equal to a preset angle threshold, obtaining the first image location based on the target image region, and obtaining the second target location according to the first image location, the pitch angle, and a geometric relationship between the target and the camera apparatus.

In some embodiments, the obtaining a second image location based on the target image region includes:

obtaining the second image location based on the target image region if a ratio of a size of the target image region to a size of the target image is greater than or equal to a preset ratio threshold.

In some embodiments, the target image region is a minimum bounding box of the target in the target image; and
the image point cloud corresponding to the target is an image point cloud whose coordinates are located in the minimum bounding box among image point clouds.

In some embodiments, the obtaining the first target location according to the image point cloud corresponding to the target includes:
obtaining a distance and a height of the target relative to the UAV according to world coordinates of the image point cloud corresponding to the target.

In some embodiments, the first image location is a highest point and a lowest point of the minimum bounding box of the target in the target image; and
the obtaining the second target location according to the first image location, the pitch angle, and a geometric relationship between the target and the camera apparatus includes:
obtaining the second target location according to the geometric relationship between the target and the camera apparatus based on a vertical coordinate $v_{min}$ of the highest point, a vertical coordinate $v_{max}$ of the lowest point, a preset height M of the target, and the pitch angle.

In some embodiments, the obtaining the second target location according to the geometric relationship between the target and the camera apparatus based on a vertical coordinate $v_{min}$ of the highest point, a vertical coordinate $v_{max}$ of the lowest point, a preset height M of the target, and the pitch angle includes:
obtaining an angle β between a line connecting the lowest point and an optical center of the camera apparatus and an optical axis of the camera apparatus according to the vertical coordinate $v_{max}$ of the lowest point;
obtaining an angle α between a line connecting the highest point and the optical center of the camera apparatus and the optical axis of the camera apparatus according to the vertical coordinate $v_{min}$ of the highest point;
obtaining an angle φ between the line connecting the highest point and the optical center of the camera apparatus and the line connecting the lowest point and the optical center of the camera apparatus according to the angle β and the angle α, where φ=β−α;
obtaining an angle δ between the line connecting the lowest point and the optical center of the camera apparatus and a vertical direction according to the angle β and the pitch angle θ of the camera apparatus, where $$\delta = \frac{\pi}{2} - \theta - \beta;$$

and
obtaining a distance and a height of the target relative to the UAV according to the angle δ, the angle φ, the preset height M, and the geometric relationship.

In some embodiments, the obtaining a distance and a height of the target relative to the UAV according to the angle δ, the angle φ, the preset height M, and the geometric relationship includes:
obtaining a length $L_2$ of the line connecting the lowest point and the optical center of the camera apparatus, and a length $L_2$ of the line connecting the highest point and the optical center of the camera apparatus through the following binary equations:

$L_1{}^2+L_2{}^2-2L_1L_2 \cos \varphi = M^2$, and $M \cos \delta + L_1 \cos \varphi = L_2$;

calculating the distance d of the target relative to the UAV through a formula $d=L_2 \sin \delta$; and
calculating the height h of the target relative to the UAV through a formula $h=L_1 \cos(\varphi+\delta)$.

In some embodiments, the obtaining an angle β between a line connecting the lowest point and an optical center of the camera apparatus and an optical axis of the camera apparatus according to the vertical coordinate $v_{max}$ of the lowest point includes:
calculating the angle β through the following formula:

$$\beta = \tan^{-1}(v_{max}-c_y)/f_y,$$

$c_y$ being a vertical coordinate of a principal point of the camera apparatus, and $f_y$ being a focal length of the camera apparatus in a y-axis direction; and
the obtaining an angle α between a line connecting the highest point and the optical center of the camera apparatus and the optical axis of the camera apparatus according to the vertical coordinate $v_{min}$ of the highest point includes:
calculating the angle α through the following formula:

$$\alpha = \tan^{-1}(v_{min}-c_y)/f_y.$$

In some embodiments, the target image region is a minimum bounding box of the target in the target image, and the second image location is center coordinates of the minimum bounding box.

In some embodiments, the initializing a target state according to the first target location or the second target location includes:
determining whether the first target location is obtained; and
initializing the target state according to the first target location if the first target location is obtained, and
initializing the target state according to the second target location if the first target location is not obtained.

In some embodiments, the using the first target location and/or the second target location and/or the second image location as measured values of an extended Kalman filter to obtain the target state includes:
when the first target location, the second target location, and the second image location are obtained, using the first target location, the second target location, and the second image location as measured values of the extended Kalman filter in any order, and updating computation of the extended Kalman filter, to finally obtain the target state;
when any two of the first target location, the second target location, and the second image location are obtained, using the any two of the first target location, the second target location, and the second image location as measured values of the extended Kalman filter in any order, and updating computation of the extended Kalman filter, to finally obtain the target state; and
when only one of the first target location, the second target location, or the second image location is obtained, using the one of the first target location, the second target location, and the second image location as a measured value of the extended Kalman filter, to finally obtain the target state.

In some embodiments, the extended Kalman filter includes a prediction stage and an update stage;
  in the update stage, the first target location and/or the second target location and/or the second image location are used as measured values of the extended Kalman filter, and an update equation is updated, to obtain an updated value; and
  in the prediction stage, the updated value obtained in the update stage is substituted into a prediction equation of the prediction stage to obtain the target state.

According to a third aspect, an embodiment of the present invention provides a target state estimation apparatus, applicable to a UAV. The UAV includes a camera apparatus. The apparatus includes:
  a target image region obtaining module, configured to obtain a target image acquired by the camera apparatus, and perform image recognition on the target image, to obtain a target image region of a target in the target image;
  a first target location obtaining module, configured to obtain a raw point cloud of a surrounding environment of the UAV, and obtain a first target location according to the target image region and the raw point cloud;
  a second target location obtaining module, configured to obtain attitude information of the camera apparatus, obtain a first image location based on the target image region, and obtain a second target location according to the first image location and the attitude information;
  a second image location obtaining module, configured to obtain a second image location based on the target image region;
  an initialization module, configured to initialize a target state according to the first target location or the second target location; and
  a recursion module, configured to use the first target location and/or the second target location and/or the second image location as measured values of an extended Kalman filter to obtain the target state,
  the target image being a two-dimensional image, and the first image location and the second image location being both locational representations of the target image region in the target image.

According to a fourth aspect, an embodiment of the present invention provides a target state estimation apparatus, applicable to a UAV. The UAV includes a camera apparatus. The apparatus includes:
  a target image region obtaining module, configured to obtain a target image acquired by the camera apparatus, and perform image recognition on the target image, to obtain a target image region of a target in the target image;
  a second target location obtaining module, configured to obtain attitude information of the camera apparatus, obtain a first image location based on the target image region, and obtain a second target location according to the first image location and the attitude information;
  a second image location obtaining module, configured to obtain a second image location based on the target image region;
  an initialization module, configured to initialize a target state according to the second target location; and
  a recursion module, configured to use the second target location and/or the second image location as measured values of an extended Kalman filter to obtain the target state,
  the target image being a two-dimensional image, and the first image location and the second image location being both locational representations of the target image region in the target image.

In some embodiments, the first target location obtaining module is further configured to: convert the raw point cloud to an image coordinate system where the target image is located, to obtain an image point cloud corresponding to the raw point cloud; and
  determine whether there is an image point cloud corresponding to the target, the image point cloud corresponding to the target being an image point cloud located in the target image region, and if there is an image point cloud corresponding to the target, obtain the first target location according to the image point cloud corresponding to the target.

In some embodiments, the attitude information is a pitch angle of the camera apparatus; and
  the second target location obtaining module is further configured to:
  obtain the pitch angle of the camera apparatus, and if the pitch angle is less than or equal to a preset angle threshold, obtain the first image location based on the target image region, and obtain the second target location according to the first image location, the pitch angle, and a geometric relationship between the target and the camera apparatus.

In some embodiments, the second image location obtaining module is further configured to:
  obtain the second image location based on the target image region if a ratio of a size of the target image region to a size of the target image is greater than or equal to a preset ratio threshold.

In some embodiments, the target image region is a minimum bounding box of the target in the target image; and
  the image point cloud corresponding to the target is an image point cloud whose coordinates are located in the minimum bounding box among image point clouds.

In some embodiments, the first target location obtaining module is further configured to:
  obtain a distance and a height of the target relative to the UAV according to world coordinates of the image point cloud corresponding to the target.

In some embodiments, the first image location is a highest point and a lowest point of the minimum bounding box of the target in the target image; and
  the second target location obtaining module is further configured to:
  obtain the second target location according to the geometric relationship between the target and the camera apparatus based on a vertical coordinate $v_{min}$ of the highest point, a vertical coordinate $v_{max}$ of the lowest point, a preset height M of the target, and the pitch angle.

In some embodiments, the second target location obtaining module is further configured to:
  obtain an angle $\beta$ between a line connecting the lowest point and an optical center of the camera apparatus and an optical axis of the camera apparatus according to the vertical coordinate $v_{max}$ of the lowest point;
  obtain an angle $\alpha$ between a line connecting the highest point and the optical center of the camera apparatus and the optical axis of the camera apparatus according to the vertical coordinate $v_{min}$ of the highest point;
  obtain an angle $\varphi$ between the line connecting the highest point and the optical center of the camera apparatus and the line connecting the lowest point and the optical center of the camera apparatus according to the angle $\beta$ and the angle $\alpha$, where $\varphi = \beta - \alpha$;

obtain an angle δ between the line connecting the lowest point and the optical center of the camera apparatus and a vertical direction according to the angle β and the pitch angle θ of the camera apparatus, where $$\delta = \frac{\pi}{2} - \theta - \beta;$$

and
obtain a distance and a height of the target relative to the UAV according to the angle δ, the angle φ, the preset height M, and the geometric relationship.

In some embodiments, the second target location obtaining module is further configured to:
obtain a length $L_2$ of the line connecting the lowest point and the optical center of the camera apparatus, and a length $L_2$ of the line connecting the highest point and the optical center of the camera apparatus through the following binary equations:

$$L_1^2 + L_2^2 - 2L_1L_2 \cos \varphi = M^2, \text{ and}$$

$$M \cos \delta + L_1 \cos \varphi = L_2;$$

calculate the distance d of the target relative to the UAV through a formula $d = L_2 \sin \delta$; and
calculate the height h of the target relative to the UAV through a formula $h = L_1 \cos(\varphi + \delta)$.

In some embodiments, the second target location obtaining module is further configured to:
calculate the angle β through the following formula:

$$\beta = \tan^{-1}((v_{max} - c_y)/f_y),$$

$c_y$ being a vertical coordinate of a principal point of the camera apparatus, and $f_y$ being a focal length of the camera apparatus in a y-axis direction; and
the obtaining an angle α between a line connecting the highest point and the optical center of the camera apparatus and the optical axis of the camera apparatus according to the vertical coordinate $v_{min}$ of the highest point includes:
calculate the angle α through the following formula:

$$\alpha = \tan^{-1}((v_{min} - c_y)/f_y).$$

In some embodiments, the target image region is a minimum bounding box of the target in the target image, and the second image location is center coordinates of the minimum bounding box.

In some embodiments, the initialization module is further configured to:
determine whether the first target location is obtained; and
initialize the target state according to the first target location if the first target location is obtained, and
initialize the target state according to the second target location if the first target location is not obtained.

In some embodiments, the recursion module is further configured to:
when the first target location, the second target location, and the second image location are obtained, use the first target location, the second target location, and the second image location as measured values of the extended Kalman filter in any order, and update computation of the extended Kalman filter, to finally obtain the target state;
when any two of the first target location, the second target location, and the second image location are obtained, use the any two of the first target location, the second target location, and the second image location as measured values of the extended Kalman filter in any order, and update computation of the extended Kalman filter, to finally obtain the target state; and
when only one of the first target location, the second target location, or the second image location is obtained, use the one of the first target location, the second target location, and the second image location as a measured value of the extended Kalman filter, to finally obtain the target state.

In some embodiments, the recursion module is further configured to:
the extended Kalman filter includes a prediction stage and an update stage;
in the update stage, the first target location and/or the second target location and/or the second image location are used as measured values of the extended Kalman filter, and an update equation is updated, to obtain an updated value; and
in the prediction stage, the updated value obtained in the update stage is substituted into a prediction equation of the prediction stage to obtain the target state.

According to a fifth aspect, an embodiment of the present invention provides a UAV. The UAV includes a body, arms connected to the body, a power system disposed on the arm, and a tracking system disposed on the body, the tracking system including a controller, the controller including:
at least one processor; and
a memory communicatively connected to the at least one processor,
the memory storing instructions executable by the at least one processor, the instructions being executed by the at least one processor, to cause the at least one processor to be capable of performing the foregoing method.

According to sixth aspect, an embodiment of the present invention provides a non-volatile computer-readable storage medium, storing computer-executable instructions, the computer-executable instructions, when executed by a UAV, causing the UAV to perform the foregoing method.

According to a seventh aspect, an embodiment of the present application further provides a computer program product, including a computer program stored in a non-volatile computer-readable storage medium. The computer program includes program instructions. The program instructions, when executed by a UAV, cause the UAV to perform the foregoing method.

According to the target state estimation method and apparatus, and the UAV of the embodiments of the present invention, image recognition is first performed on a target image, to obtain a target image region of a target in the target image; a first target location is then obtained according to the target image region and a raw point cloud of a surrounding environment of the UAV; a second target location is obtained according to a first image location determined based on the target image region and attitude information of the camera apparatus; a second image location is obtained according to the target image region; a target state is initialized according to the first target location or the second target location by using an extended Kalman filter; and the first target location and/or the second target location and/or the second image location are used as measured values of the extended Kalman filter to obtain the target state. The embodiments of the present invention do not require strong assumptions and do not rely on height information of the ground plane and the outside world, and can achieve precise estimation of a target state in a target tracking-based UAV autonomous obstacle avoidance system.

BRIEF DESCRIPTION OF THE DRAWINGS

One or more embodiments are exemplarily described with reference to the corresponding figures in the accompanying drawings, and the descriptions are not to be construed as limiting the embodiments. Components in the accompanying drawings that have same reference numerals are represented as similar components, and unless otherwise particularly stated, the figures in the accompanying drawings are not drawn to scale.

FIG. 5 is a schematic diagram of a geometric relationship met by a target and a camera apparatus of a tracking system in an embodiment of a target state estimation method according to the present invention;

FIG. 6 is a schematic flowchart of obtaining a second target location in an embodiment of a target state estimation method according to the present invention;

FIG. 7 is a schematic flowchart of obtaining a second image location in an embodiment of a target state estimation method according to the present invention;

DETAILED DESCRIPTION

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are merely some embodiments of the present invention rather than all of the embodiments. All other embodiments obtained by a person of ordinary skill in the art based on the embodiments of the present invention without creative efforts shall fall within the protection scope of the present invention.

Figure 1:
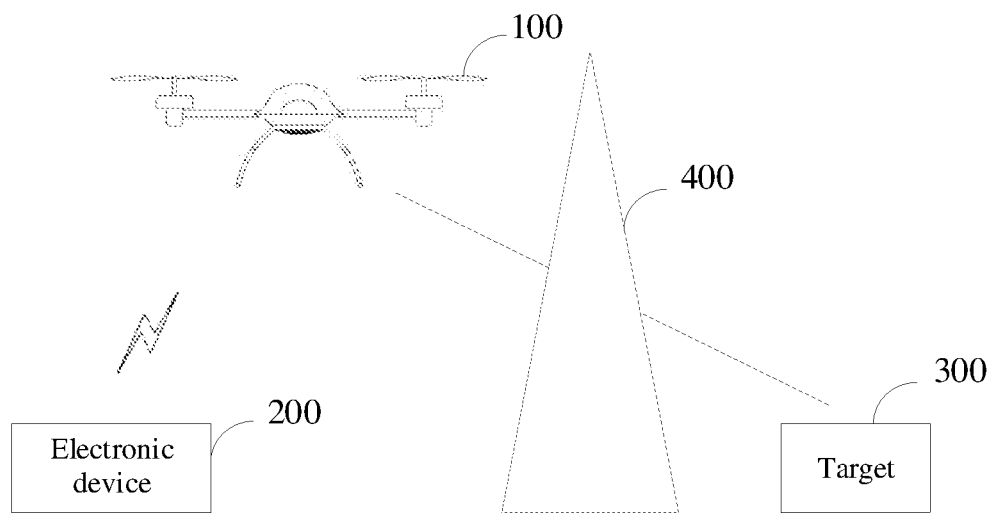
FIG. 1 is a schematic diagram of an application scenario of a target state estimation method and apparatus according to an embodiment of the present invention.

A target state estimation method and apparatus provided in the embodiments of the present invention is applicable to an application scenario shown in FIG. 1. As shown in FIG. 1, the application scenario includes a UAV 100 and a target 300. The UAV 100 may be configured to track the target 300, and when tracking the target 300, the UAV 100 may encounter an obstacle 400. The UAV 100 needs to avoid the obstacle 400 to fly normally while tracking the target 300.

The UAV 100 may be a suitable unmanned aircraft, including a fixed-wing unmanned aircraft and a rotary-wing unmanned aircraft, for example, a helicopter, a quadcopter, and an aircraft having other quantities of rotors and/or rotor configurations. The UAV 100 may be alternatively another movable object such as a manned aircraft, a model airplane, an unmanned airship, an unmanned hot air balloon, or a robot. The target 300 may be any suitable movable or non-movable object, including vehicles, people, animals, buildings, mountains, rivers, or the like. The obstacle 400 is, for example, a building, a mountain, a tree, a forest, a signal tower or another movable or non-movable object (only one obstacle is shown in FIG. 1, and there may be more obstacles or no obstacle during actual application).

Figure 2:
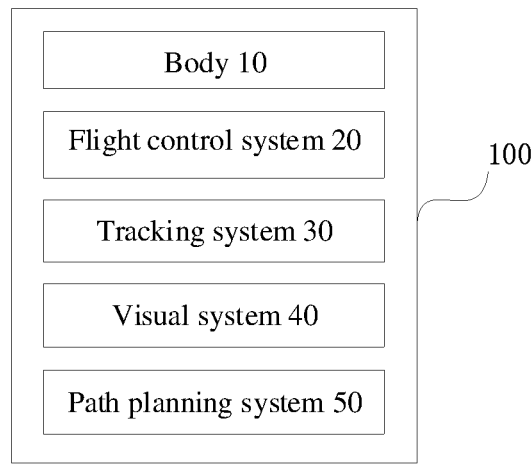
FIG. 2 is a schematic structural diagram of an embodiment of a UAV according to the present invention.

In some embodiments, referring to FIG. 2, the UAV 100 includes a body 10, arms (not shown in the figure) connected to the body 10, a power system (not shown in the figure) disposed on the arm, and a control system disposed on the body 10. The power system is configured to provide a thrust, a lift force and the like for the UAV 100 to fly. The control system is a central nerve of the UAV 100 and may include a plurality of functional units, for example, a flight control system 20, a tracking system 30, a path planning system 50, a visual system 40 and another system having a specific function. Both the tracking system 30 and the visual system 40 include a camera apparatus and a control chip. The tracking system 30 is configured to obtain a state of a tracked target, a tracking distance (that is, a distance between the UAV 100 and the target), and the like. The visual system 40 is configured to provide an environment map, a raw point cloud of a surrounding environment of the UAV, or the like. The flight control system 20 includes various sensors (for example, a gyroscope and an accelerometer), and the flight control system 20 is configured to obtain a real-time location of the UAV and control a flight attitude of the UAV. The path planning system 50 is configured to plan a path and instruct the flight control system 20 to control the flight attitude of the UAV 100 to cause the UAV 100 to fly according to a designated path.

During actual application, the flight control system 20 and the path planning system 50 may be disposed inside the body 10, and the tracking system 30 and the visual system 40 may be disposed outside the body 10 and fixed on the body 10. The camera apparatuses of the tracking system 30 and the visual system 40 may form a monocular or binocular visual system. The camera apparatus may be a high-definition digital camera or another camera apparatus. The camera apparatus may be disposed at any suitable location for shooting. In some embodiments, the camera apparatus of the tracking system 30 is mounted at the bottom of the body 10 by using a gimbal, and the camera apparatus of the visual system 40 is disposed on a front portion and/or a lower portion of the body 10. The systems may be set separately. In some embodiments, some or all of the systems may be alternatively integrated in one or more apparatuses.

In some embodiments, the UAV 100 tracks the target according to a target feature. In some embodiments, the target feature is pre-stored in the UAV 100. In some embodiments, the target feature is obtained in another way. Some application scenarios of the UAV 100 further include an electronic device 200, and the target feature may be sent to the UAV 100 by using the electronic device 200. Specifically, the electronic device 200 may display a picture captured by the UAV 100, and a user frames a target in the picture. After a target picture framed by the user is uploaded to the UAV 100, the UAV 100 may extract a target feature according to the framed target picture. A communication connection may be established between the UAV 100 and the electronic device 200 by using wireless communication modules (for example, a signal receiver and a signal transmitter) configured in the UAV and the electronic device respectively for uploading or delivering data/instructions. The electronic device 200 is, for example, a smartphone, a tablet computer, a computer or a remote controller.

In a process of tracking a target and avoiding obstacles, the UAV 100 needs to plan an appropriate path according to a target state, and fly according to the planned path to avoid obstacles while keeping track. Therefore, the estimation of the target state is crucial. According to the embodiments of the present invention, various methods are used to obtain a correlation value of a target location. The correlation value of the target location is used as a measured value of an extended Kalman filter. The extended Kalman filter is used to perform recursive estimation to obtain an estimated value of the target state. The embodiments of the present invention do not require strong assumptions, and the precision of state estimation is high. The target state is, for example, a location, a speed, or the like of the target.

Figure 3A:
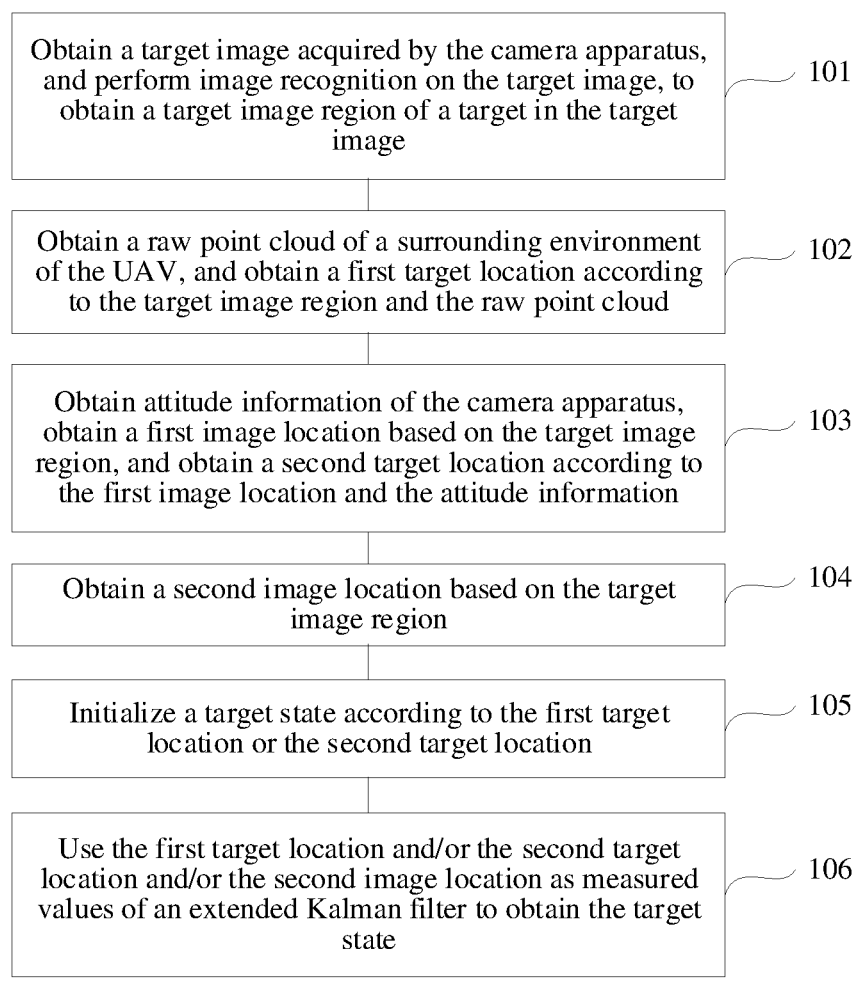
FIG. 3a is a schematic flowchart of an embodiment of a target state estimation method according to the present invention.

FIG. 3*a* is a schematic flowchart of a target state estimation method according to an embodiment of the present invention. The method may be performed by a UAV (for example, the UAV 100 in FIG. 1, specifically, in some embodiments, the method is performed by the tracking system in the UAV 100). As shown in FIG. 3*a*, the method includes:

101: Obtain a target image acquired by the camera apparatus, and perform image recognition on the target image, to obtain a target image region of a target in the target image.

In some embodiments, the target image may be obtained using the camera apparatus of the tracking system of the UAV. To perform image recognition on the target image, a tracker may be pre-trained based on a target feature for recognition. The tracker may be directly loaded on the UAV 100 after being obtained by other apparatuses by training a tracking model. In some other embodiments, the tracker is obtained by the UAV 100 by training a tracking model. The tracker may be a tracker based on a kernel correlation filter (KCF) algorithm, or other correlation filter trackers may be used.

The target image region of the target in the target image may be obtained by inputting the target image into the tracker. In some embodiments, the target image region is a minimum bounding box of the target in the target image. The minimum bounding box is, for example, a smallest circumscribed rectangular region that frames the target in the target image.

102: Obtain a raw point cloud of a surrounding environment of the UAV, and obtain a first target location according to the target image region and the raw point cloud.

The raw point cloud of the surrounding environment may be obtained by using the camera apparatus of the visual system, such as a depth sensor or a binocular camera. When viewing angles of an image obtained by the tracking system and an image obtained by the visual system have an overlapping region, and the target is located in the overlapping region, it may be determined which location points in the raw point cloud of the surrounding environment obtained by the visual system are location points corresponding to the target. The first target location of the target may be determined through these location points. The first target location is, for example, a distance and a height of the target relative to the UAV. However, when the target is not in the overlapping region or there is no overlapping region, the first target location cannot be obtained by using this method.

Figure 4:
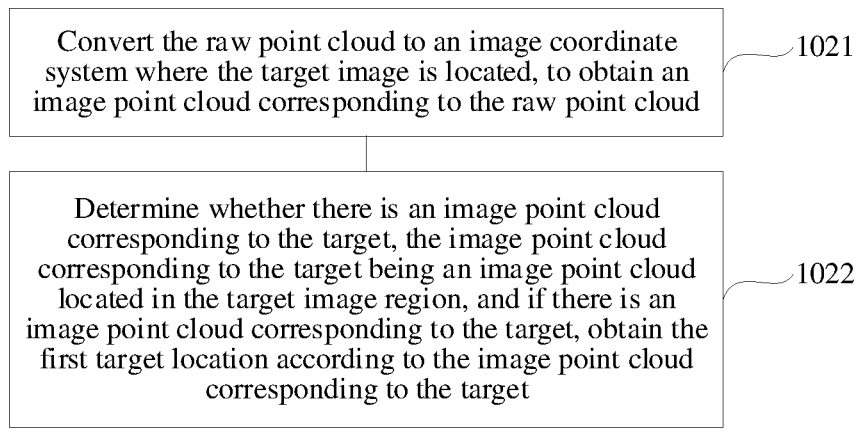
FIG. 4 is a schematic flowchart of obtaining a first target location in an embodiment of a target state estimation method according to the present invention.

Therefore, in some embodiments, it may be first determined whether the target is located in the overlapping region. If the target is located in the overlapping region, the first target location is then obtained. Specifically, as shown in FIG. 4, step 102 includes:

1021: Convert the raw point cloud to an image coordinate system where the target image is located, to obtain an image point cloud corresponding to the raw point cloud.

Because the raw point cloud is located in a coordinate system of the camera apparatus of the visual system, and the target image is located in an image coordinate system of the camera apparatus of the tracking system, the raw point cloud and the target image need to be unified to the same coordinate system first. In this embodiment, the raw point cloud is converted to the image coordinate system where the target image is located. Coordinates of the raw point cloud in the coordinate system of the camera apparatus of the visual system may be first converted to a body coordinate system of the UAV. The coordinates are then converted from the body coordinate system to the image coordinate system. If p is used to represent three-dimensional coordinates of a point in the coordinate system of the camera apparatus of the visual system, and p' is used to represent two-dimensional coordinates of the point projected to the image coordinate system, then:

$$s \begin{bmatrix} p' \\ 1 \end{bmatrix} = K_{intrinsic} \cdot T1 \cdot T2 \cdot p$$

T1 is a conversion matrix from the coordinate system of the camera apparatus of the visual system to the body coordinate system. T2 is a conversion matrix from the body coordinate system to the image coordinate system. $K_{intrinsic}$ is an intrinsic matrix of the camera apparatus of the tracking system. s represents a common factor extracted so that a third coordinate of the left matrix is 1. Since T1, T2, and $K_{intrinsic}$ may be obtained through pre-calibration, two-dimensional coordinates of any point in the raw point cloud projected to the image coordinate system may be obtained through the foregoing formula, that is, the image point cloud corresponding to the raw point cloud in the image coordinate system may be obtained.

1022: Determine whether there is an image point cloud corresponding to the target, the image point cloud corresponding to the target being an image point cloud located in the target image region, and if there is an image point cloud corresponding to the target, obtain the first target location according to the image point cloud corresponding to the target.

If the target is located in an overlapping region of viewing angles a depth map and a gimbal image of a binocular camera, there is an image point cloud located in the target image region in the image point cloud obtained by projecting the raw point cloud to the image coordinate system. This image point cloud is the image point cloud corresponding to the target. In a scenario in which the target image region is the minimum bounding box of the target in the target image, it is determined whether there is an image point cloud corresponding to the target, that is, whether there is an image point cloud whose coordinates are located in the minimum bounding box.

The first target location is obtained according to the image point cloud corresponding to the target. For example, a distance and a height of the target relative to the UAV are obtained according to world coordinates of the image point cloud corresponding to the target. First, a three-dimensional point cloud map of the surrounding environment of the UAV 100 is established. Specifically, in some embodiments, both the raw point cloud obtained by the visual system and the image point cloud corresponding to the target are converted to the world coordinate system. The raw point cloud and the image point cloud are merged in the world coordinate system. All point clouds are post-processed by using a method such as pixel filtering or octree, to obtain the three-dimensional point cloud map of the surrounding environment of the UAV 100. A location of the target in the three-dimensional point cloud map may be obtained according to the processed world coordinates of the image point cloud corresponding to the target. The location may be an average value of world coordinates of image point clouds corresponding to the target. The distance and the height of the target relative to the UAV may be obtained according to the target location and the location of the UAV obtained by the UAV through the flight control system.

In some embodiments, after the image point cloud corresponding to the target is obtained, filtering processing may be performed on the image point cloud to remove an image point cloud that does not belong to the target. Specifically, the filtering processing may be performed by using a filtering algorithm such as Gaussian filtering, radius filtering, clustering, smoothing, or a connected domain method.

103: Obtain attitude information of the camera apparatus, obtain a first image location based on the target image region, and obtain a second target location according to the first image location and the attitude information.

The first image location is location coordinates related to the target image region.

A specific geometric relationship is met between the camera apparatus of the tracking system and the target. The second target location may be obtained through the geometric relationship and some known quantities therein. The second target location is, for example, the distance and the height of the target relative to the UAV. The attitude information is information representing a state or an attitude of the camera apparatus of the tracking system, which includes a pitch angle of the camera apparatus and the like.

FIG. 5 is a schematic diagram of one of geometric relationships met by a target and a camera apparatus. The second target location may be obtained through such a geometric relationship. In a scenario in which the attitude information of the camera apparatus is the pitch angle of the camera apparatus ($\theta$ in the figure represents the pitch angle of the camera apparatus). When the target is close to the bottom of the UAV, the pitch angle of the camera apparatus is relatively large, which may cause the target to have a small proportion of the side in the image obtained by the tracking system. In this case, the precision of the second target location obtained by using this method is not high. Therefore, in some embodiments, to improve the precision of the overall calculation, when the pitch angle is relatively large, for example, larger than a preset angle threshold, the second target location is not obtained by using this method. That is, the second target location is not used as a measured value for the extended Kalman filter. Only when the pitch angle is less than or equal to the preset angle threshold, the second target location is obtained by using this method.

That is, in some embodiments, as shown in FIG. 6, step 103 includes:

1031: Obtain the pitch angle of the camera apparatus, and if the pitch angle is less than or equal to a preset angle threshold, obtain the first image location based on the target image region, and obtaining the second target location according to the first image location, the pitch angle, and a geometric relationship between the target and the camera apparatus.

The preset angle threshold may be set according to the actual application, for example, may be set to about 60 degrees (a horizontal location is taken as 0 degrees, and rotation is performed downward by 60 degrees). The first image location is, for example, a coordinate location related to the target image region. In an embodiment, referring to FIG. 5, the first image location is two-dimensional coordinates of a highest point and a lowest point of the minimum bounding box of the target in the target image (in FIG. 5, $v_{min}$ is used to represent a vertical coordinate of the highest point, and $v_{max}$ is used to represent a vertical coordinate of the lowest point). Since the type of the target tracked by the UAV is pre-learned, the height of the target may be preset. For example, the user may input the preset height of the target into an electronic device, and then send the present height to the UAV through the electronic device.

The second target location may be obtained according to the specific geometric relationship between the target and the camera apparatus based on the vertical coordinate $v_{min}$ of the highest point, the vertical coordinate $v_{max}$ of the lowest point, the preset height M of the target, and the pitch angle. The process of calculating and obtaining the second target location is described below by taking FIG. 5 as an example. Specifically, in some embodiments, the process may be implemented through the following steps:

A: Obtain an angle $\beta$ between a line connecting the lowest point and an optical center of the camera apparatus and an optical axis of the camera apparatus according to the vertical coordinate $v_{max}$ of the lowest point.

Specifically, in some embodiments, the angle $\beta$ may be calculated through the following formula:

$\beta = \tan^{-1}((v_{max} - c_y)/f_y)$, $c_y$ being a vertical coordinate of a principal point of the camera apparatus, and $f_y$ being a focal length of the camera apparatus in a y-axis direction.

B: Obtain an angle $\alpha$ between a line connecting the highest point and the optical center of the camera apparatus and the optical axis of the camera apparatus according to the vertical coordinate $v_{min}$ of the highest point.

Specifically, in some embodiments, the angle $\alpha$ may be calculated through the following formula:

$\alpha = \tan^{-1}((v_{min} - c_y)/f_y)$,

C: Obtain an angle $\varphi$ between the line connecting the highest point and the optical center of the camera apparatus and the line connecting the lowest point and the optical center of the camera apparatus according to the angle $\beta$ and the angle $\alpha$, where $\varphi = \beta - \alpha$.

D: Obtain an angle $\delta$ between the line connecting the lowest point and the optical center of the camera apparatus and a vertical direction according to the angle $\beta$ and the pitch angle $\theta$ of the camera apparatus, where $$\delta = \frac{\pi}{2} - \theta - \beta.$$

E: Obtain a distance and a height of the target relative to the UAV according to the angle δ, the angle φ, the preset height M, and the geometric relationship.

Specifically, in an embodiment, the target and the camera apparatus meet the following relationship:

$$L_1^2 + L_2^2 - 2L_1L_2 \cos \varphi = M^2, \text{ and}$$

$$M \cos \delta + L_1 \cos \varphi = L_2.$$

$L_2$ is the length of the line connecting the lowest point and the optical center of the camera apparatus. $L_1$ is the length of the line connecting the highest point and the optical center of the camera apparatus. $L_1$ and $L_2$ may be solved by solving the foregoing binary equations.

Therefore, the distance d of the target relative to the UAV may be calculated through a formula $d = L_2 \sin \delta$. The height h of the target relative to the UAV may be calculated through a formula $h = L_1 \cos(\varphi + \delta)$.

104: Obtain a second image location based on the target image region.

The second image location may be a related coordinate location of the target image region in the target image, for example, two-dimensional coordinates of a center of the minimum bounding box. When the target image region occupies a relatively small proportion in the target image, for example, the proportion is smaller than a preset ratio threshold, the precision cannot be improved by using the second image location as a measured value of the extended Kalman filter. Therefore, the second image location is obtained only when a ratio of the target image region to the target image is greater than or equal to the preset ratio threshold, and the obtained second image location is used as a measured value of the extended Kalman filter. The preset ratio threshold may be set according to the actual application, for example, 0.1%.

That is, in some embodiments, as shown in FIG. 7, step 104 includes:
  1041: Obtain the second image location based on the target image region if a ratio of a size of the target image region to a size of the target image is greater than or equal to a preset ratio threshold.
  105: Initialize a target state according to the first target location or the second target location.

The target state being the location and the speed of the target is taken as an example to illustrate the process of performing recursive estimation by using the extended Kalman filter to obtain the target state. The target state quantity is defined as $X = [p_x, p_y, p_z, v_x, v_y, v_z]^T$ ($p_x, p_y, p_z$) is the location of the target in the world coordinate system. ($v_x, v_y, v_z$) is the speed of the target in the world coordinate system. In the extended Kalman filter, the target state needs to be initialized first. Specifically, the location ($p_x, p_y, p_z$) of the target may be initialized by using the first target location or the second target location. The speed is initialized as (0, 0, 0), and a covariance P is initialized as:

$$F = \begin{bmatrix} 0.1 & 0 & 0 & 0 & 0 & 0 \\ 0 & 0.1 & 0 & 0 & 0 & 0 \\ 0 & 0 & 0.1 & 0 & 0 & 0 \\ 0 & 0 & 0 & 0.1 & 0 & 0 \\ 0 & 0 & 0 & 0 & 0.1 & 0 \\ 0 & 0 & 0 & 0 & 0 & 0.1 \end{bmatrix}.$$

The first target location or the second target location is used to initialize the location of the target. For example, if the first target location is obtained, the first target location is used to initialize the location of the target. Otherwise, the second target location is used to initialize the location of the target. Certainly, any of the first target location or the second target location may be alternatively selected to initialize the location of the target.

106: Use the first target location and/or the second target location and/or the second image location as measured values of an extended Kalman filter to obtain the target state.

One or more of the first target location, the second target location, and the second image location may be used as measured values of the extended Kalman filter to obtain the target state X.

In an embodiment, location values in the first target location, the second target location, and the second image location are used as measured values of the extended Kalman filter as much as possible while ensuring the precision, to obtain the target state X. That is, if the first target location and the second target location are obtained, the first target location and the second target location are both used as measured values of the extended Kalman filter; and If the first target location, the second target location, and the second image location are obtained, the first target location, the second target location, and the second image location are used as measured values of the extended Kalman filter. In this embodiment, step 106 includes:
  a: If there is an image point cloud corresponding to the target in the target image region, update the target state and the covariance with the first target location as a measured value of the extended Kalman filter.
  b: If the pitch angle of the camera apparatus is less than or equal to the preset angle threshold, update the target state and the covariance with the second target location as a measured value of the extended Kalman filter; otherwise the second target location is not used as a measured value of the extended Kalman filter.
  c: If the ratio of the target image region to the target image is greater than or equal to the preset ratio threshold, update the target state and the covariance with the second image location as a measured value of the extended Kalman filter; otherwise the second image location is not used as a measured value of the extended Kalman filter.

The core idea of an extended Kalman filtering algorithm is prediction+measurement feedback, which includes two parts. The first part is a state prediction equation, and the second part is an observation equation. In a prediction stage, a predicted value calculated by a system state equation is used as prior information. The information is then re-updated in the observation part. The extended Kalman filtering algorithm is in the prior art. The specific related content may refer to the prior art. An embodiment is taken as an example below to describe the process of obtaining the target state by using the extended Kalman filter.

In the prediction stage, the target state and covariance equations are respectively:

$$X'(k) = F \cdot X'(k-1) \qquad (1), \text{ and}$$

$$P'(k) = F \cdot P'(k-1) F^T + Q \qquad (2).$$

X'(k) is a predicted value of the target state, P'(k) is a predicted value of the covariance, and Q is a noise matrix.

In the prediction stage, $$F = \begin{bmatrix} 1, & 0, & 0, & dt, & 0, & 0 \\ 0, & 1, & 0, & 0, & dt, & 0 \\ 0, & 0, & 1, & 0, & 0, & dt \\ 0, & 0, & 0, & 1, & 0, & 0, \\ 0, & 0, & 0, & 0, & 1, & 0 \\ 0, & 0, & 0, & 0, & 0, & 1 \end{bmatrix}.$$

In the prediction stage, the predicted values X'(k) and P'(k) may be obtained by iterating formula (1) and formula (2) through initial values.

In an observation stage, update equations are as follows:

$$X(k) = X'(k) + K \cdot \text{err} \quad (3),$$

$$P(k) = (I - K \cdot H) \cdot P'(k) \quad (4),$$

where K is a Kalman gain, $$K = P'(k) \cdot H \cdot S \quad (5), \text{ and}$$

$$S = M \cdot P'(k) \cdot H^T + R \quad (6).$$

R is a measurement noise variance. H is a state-to-observation conversion matrix. err is an error between a measured value and an estimated value. Since R and H are known quantities, S may be obtained through formula (6). K may be obtained through formula (5). Therefore, the updated X(k) may be obtained through formula (3) only by solving err.

The updated X(k) and P(k) are used as input values of the prediction equation. That is, X(k) is used as X'(k−1), and P(k) is used as P'(k−1). The predicted target state X'(k) and P'(k) are finally obtained.

If the first target location, the second target location, and the second image location are all used as measured values, in the observation stage, the update equation (3) is iteratively updated by using the three values in any order to obtain an updated value X(k). If any two of the first target location, the second target location, and the second image location are used as measured values, the update equation (3) is iteratively updated by using the any two values in any order to obtain the updated value X(k). If only one of the first target location, the second target location, or the second image location is used as a measured value, the update equation (3) is iteratively updated by using the one value to obtain the updated value X(k).

An example is taken for illustration in which the first target location, the second target location, and the second image location are all used as measured values. X'(k) obtained in the prediction stage and err obtained by using the first target location are substituted into the update equation (3) to obtain a first updated value. The first updated value is used as an input of the next update. That is, the first updated value is used as X'(k). The first updated value and err obtained by using the second target location are substituted into the update equation (3) to obtain a second updated value. The second updated value is continuously used as an input of the next update. That is, the second updated value is used as X'(k). The second updated value and err obtained by using the second image location are substituted into the update equation (3) to obtain a final updated value.

For the measured values of the first target location, the second target location, and the second image location, err thereof is calculated by using different methods. For the second image location, the second image location being center coordinates of the minimum bounding box is taken as an example for illustration. The measured values are the center coordinates $[b_x, b_y]^T$ of the minimum bounding box, and projected coordinates $[x, y]^T$ of the estimated value in the image coordinate system are:

$$\begin{bmatrix} sx \\ sy \\ s \end{bmatrix} = K_{intrinsic} \cdot T_{w2g} \cdot M_{mask} \cdot X$$

$M_{mask}$ is a location mask, whose specific expression is $$M_{mask} = \begin{bmatrix} 1, 0, 0, 0, 0, 0 \\ 0, 1, 0, 0, 0, 0 \\ 0, 0, 1, 0, 0, 0 \end{bmatrix}.$$

$T_{w2g}$ is a conversion matrix from the world coordinate system to the camera coordinate system. The matrix may be obtained from the flight control system. $K_{intrinsic}$ is an intrinsic matrix of the camera apparatus of the tracking system, which may be obtained through a camera calibration technology. s represents a common factor extracted so that a third coordinate of the left matrix is 1.

In this embodiment, err is:

$$\text{err} = \begin{bmatrix} b_x \\ b_y \end{bmatrix} - \begin{bmatrix} x \\ y \end{bmatrix}.$$

For the first target location and the second target location, the first target location and the second target location being respectively the distance and the height of the target relative to the UAV is used as an example for illustration. The measured values are the distance d and the height h obtained.

The expression of the estimated value d' of the distance d is:

$$d' = M_{dis} \cdot T_{w2g} \cdot M_{mask} \cdot X$$

If $M_{dis} = [0,0,1]$, err=d−d'.

The expression of the estimated value h' of the height h is:

$$h' = M_{altitude} \cdot X$$

If $M_{altitude} = [0,0,1,0,0,0]$, err=h−h'.

According to the embodiments of the present invention, image recognition is first performed on a target image, to obtain a target image region of a target in the target image; a first target location is then obtained according to the target image region and a raw point cloud of a surrounding environment of the UAV; a second target location is obtained according to a first image location determined based on the target image region and attitude information of the camera apparatus; a second image location is obtained according to the target image region; a target state is initialized according to the first target location or the second target location by using an extended Kalman filter; and the first target location and/or the second target location and/or the second image location are used as measured values of the extended Kalman filter to obtain the target state. The embodiments of the present invention do not rely on the ground plane assumption and the data of the height relative to the ground of the UAV, and can accurately predict the motion of the target even when the target is blocked, thereby having good robustness and high precision. It should be noted that, the sequence numbers in the embodiments of the present invention are only used to identify each method step, and are not used to indicate the sequence.

It should be noted that, the foregoing step numbers (for example, 101 and 102) are only used to identify each step, and are not used to limit the sequence of the steps.

Figure 3B:
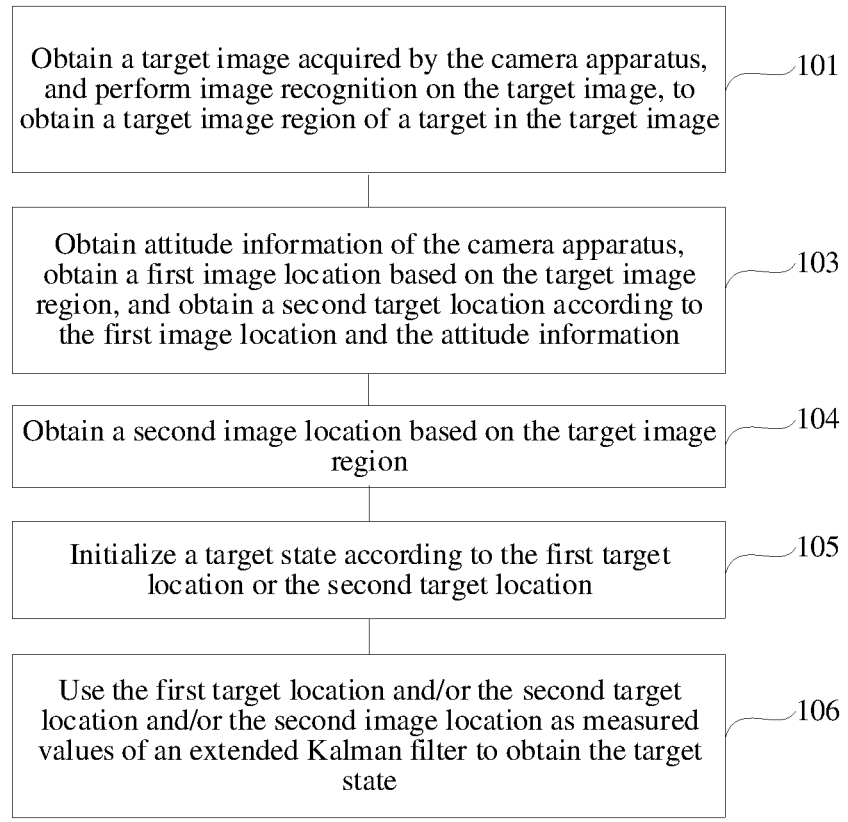
FIG. 3b is a schematic flowchart of an embodiment of a target state estimation method according to the present invention.

FIG. 3b shows another embodiment of a target state estimation method according to the present invention. The embodiment shown in FIG. 3b is suitable for a scenario in which a UAV cannot obtain a map of a surrounding environment. The difference between the embodiment shown in FIG. 3b and the embodiment shown in FIG. 3a is that, the embodiment shown in FIG. 3b does not include step 102, that is, in this embodiment, only the second target location and/or the second image location is used to estimate the target state.

Figure 8A:
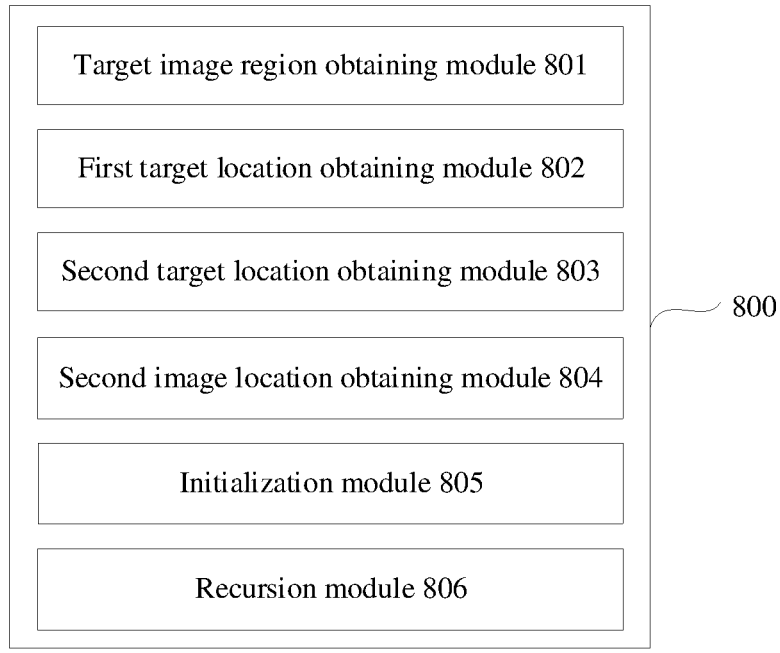
FIG. 8a is a schematic structural diagram of an embodiment of a target state estimation apparatus according to the present invention.

Correspondingly, as shown in FIG. 8a, an embodiment of the present invention further provides a target state estimation apparatus. The apparatus is applicable to a UAV (for example, the UAV shown in FIG. 1). The target state estimation apparatus 800 includes:

a target image region obtaining module 801, configured to obtain a target image acquired by the camera apparatus, and perform image recognition on the target image, to obtain a target image region of a target in the target image;

a first target location obtaining module 802, configured to obtain a raw point cloud of a surrounding environment of the UAV, and obtain a first target location according to the target image region and the raw point cloud;

a second target location obtaining module 803, configured to obtain attitude information of the camera apparatus, obtain a first image location based on the target image region, and obtain a second target location according to the first image location and the attitude information;

a second image location obtaining module 804, configured to obtain a second image location based on the target image region;

an initialization module 805, configured to initialize a target state according to the first target location or the second target location; and a recursion module 806, configured to use the first target location and/or the second target location and/or the second image location as measured values of an extended Kalman filter to obtain the target state.

According to the embodiments of the present invention, image recognition is first performed on a target image, to obtain a target image region of a target in the target image; a first target location is then obtained according to the target image region and a raw point cloud of a surrounding environment of the UAV; a second target location is obtained according to a first image location determined based on the target image region and attitude information of the camera apparatus; a second image location is obtained according to the target image region; a target state is initialized according to the first target location or the second target location by using an extended Kalman filter; and the first target location and/or the second target location and/or the second image location are used as measured values of the extended Kalman filter to obtain the target state. The embodiments of the present invention do not rely on the ground plane assumption and the data of the height relative to the ground of the UAV, and can accurately predict the motion of the target even when the target is blocked, thereby having good robustness and high precision.

In some embodiments, the first target location obtaining module 802 is further configured to:
convert the raw point cloud to an image coordinate system where the target image is located, to obtain an image point cloud corresponding to the raw point cloud; and
determine whether there is an image point cloud corresponding to the target, the image point cloud corresponding to the target being an image point cloud located in the target image region, and if there is an image point cloud corresponding to the target, obtain the first target location according to the image point cloud corresponding to the target.

In some embodiments, the attitude information is a pitch angle of the camera apparatus; and
the second target location obtaining module 803 is further configured to:
obtain the pitch angle of the camera apparatus, and if the pitch angle is less than or equal to a preset angle threshold, obtain the first image location based on the target image region, and obtain the second target location according to the first image location, the pitch angle, and a geometric relationship between the target and the camera apparatus.

In some embodiments, the second image location obtaining module 804 is further configured to:
obtain the second image location based on the target image region if a ratio of a size of the target image region to a size of the target image is greater than or equal to a preset ratio threshold.

In some embodiments, the target image region is a minimum bounding box of the target in the target image; and
the image point cloud corresponding to the target is an image point cloud whose coordinates are located in the minimum bounding box among image point clouds.

In some embodiments, the first target location obtaining module 802 is further configured to:
obtain a distance and a height of the target relative to the UAV according to world coordinates of the image point cloud corresponding to the target.

In some embodiments, the first image location is a highest point and a lowest point of the minimum bounding box of the target in the target image; and
the second target location obtaining module 803 is further configured to:
obtain the second target location according to the geometric relationship between the target and the camera apparatus based on a vertical coordinate $v_{min}$ of the highest point, a vertical coordinate $v_{max}$ of the lowest point, a preset height M of the target, and the pitch angle.

In some embodiments, the second target location obtaining module 803 is further configured to:
obtain an angle β between a line connecting the lowest point and an optical center of the camera apparatus and an optical axis of the camera apparatus according to the vertical coordinate $v_{max}$ of the lowest point;
obtain an angle α between a line connecting the highest point and the optical center of the camera apparatus and the optical axis of the camera apparatus according to the vertical coordinate $v_{min}$ of the highest point;
obtain an angle φ between the line connecting the highest point and the optical center of the camera apparatus and the line connecting the lowest point and the optical center of the camera apparatus according to the angle β and the angle α, where p=β−α;
obtain an angle δ between the line connecting the lowest point and the optical center of the camera apparatus and a vertical direction according to the angle β and the pitch angle θ of the camera apparatus, where $$\delta = \frac{\pi}{2} - \theta - \beta;$$

and obtain a distance and a height of the target relative to the UAV according to the angle δ, the angle φ, the preset height M, and the geometric relationship.

In some embodiments, the second target location obtaining module 803 is further configured to:

obtain a length $L_2$ of the line connecting the lowest point and the optical center of the camera apparatus, and a length $L_2$ of the line connecting the highest point and the optical center of the camera apparatus through the following binary equations:

$$L_1^2 + L_2^2 - 2L_1L_2 \cos \varphi = M^2, \text{ and}$$

$$M \cos \delta + L_1 \cos \varphi = L_2;$$

calculate the distance d of the target relative to the UAV through a formula $d = L_2 \sin \delta$; and calculate the height h of the target relative to the UAV through a formula $h = L_1 \cos(\varphi + \delta)$.

In some embodiments, the second target location obtaining module 803 is further configured to:

calculate the angle β through the following formula:

$$\beta = \tan^{-1}((v_{max} - c_y)/f_y),$$

$c_y$ being a vertical coordinate of a principal point of the camera apparatus, and $f_y$ being a focal length of the camera apparatus in a y-axis direction; and the obtaining an angle α between a line connecting the highest point and the optical center of the camera apparatus and the optical axis of the camera apparatus according to the vertical coordinate $v_{min}$ of the highest point includes:

calculate the angle α through the following formula:

$$\alpha = \tan^{-1}((v_{min} - c_y)/f_y).$$

In some embodiments, the target image region is a minimum bounding box of the target in the target image, and the second image location is center coordinates of the minimum bounding box.

In some embodiments, the initialization module 805 is further configured to:

determine whether the first target location is obtained; and initialize the target state according to the first target location if the first target location is obtained, and initialize the target state according to the second target location if the first target location is not obtained.

In some embodiments, the recursion module 806 is further configured to:

when the first target location, the second target location, and the second image location are obtained, use the first target location, the second target location, and the second image location as measured values of the extended Kalman filter in any order, and update computation of the extended Kalman filter, to finally obtain the target state;

when any two of the first target location, the second target location, and the second image location are obtained, use the any two of the first target location, the second target location, and the second image location as measured values of the extended Kalman filter in any order, and update computation of the extended Kalman filter, to finally obtain the target state; and when only one of the first target location, the second target location, or the second image location is obtained, use the one of the first target location, the second target location, and the second image location as a measured value of the extended Kalman filter, to finally obtain the target state.

In some embodiments, the recursion module 806 is further configured to:

the extended Kalman filter includes a prediction stage and an update stage;

in the update stage, the first target location and/or the second target location and/or the second image location are used as measured values of the extended Kalman filter, and an update equation is updated, to obtain an updated value; and in the prediction stage, the updated value obtained in the update stage is substituted into a prediction equation of the prediction stage to obtain the target state.

It should be noted that, the foregoing apparatus may perform the method provided in the embodiments of the present application, and has the corresponding functional modules for performing the method and beneficial effects thereof. For technical details not described in detail in the apparatus embodiments, reference may be made to the method provided in the embodiments of the present application.

Figure 8B:
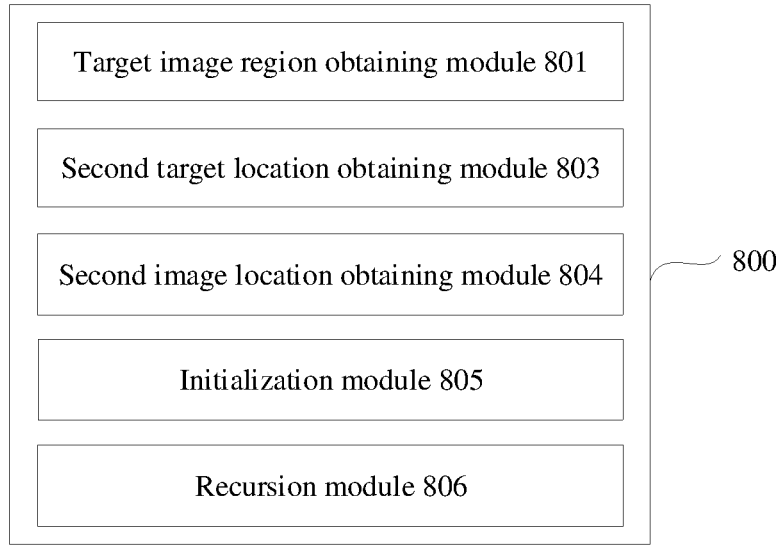
FIG. 8b is a schematic structural diagram of an embodiment of a target state estimation apparatus according to the present invention.

FIG. 8b shows another embodiment of a target state estimation apparatus according to the present invention. The embodiment shown in FIG. 8b is suitable for a scenario in which a UAV cannot obtain a map of a surrounding environment. The difference between the embodiment shown in FIG. 8b and the embodiment shown in FIG. 8a is that, the embodiment shown in FIG. 8b does not include the first target location obtaining module 802, that is, in this embodiment, only the second target location and/or the second image location is used to estimate the target state.

Figure 9:
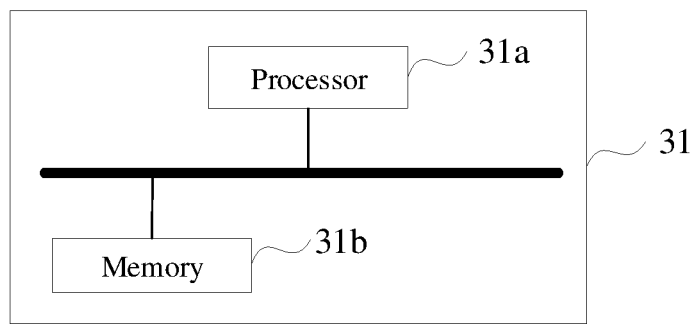
FIG. 9 is a schematic diagram of a hardware structure of a controller of a tracking system in an embodiment of a UAV according to the present invention.

FIG. 9 is a schematic diagram of a hardware structure of a controller 31 of a tracking system in an embodiment of a UAV according to the present invention. As shown in FIG. 9, the controller 31 includes:

one or more processors 31a and a memory 31b, where one processor 31a is used as an example in FIG. 9.

The processor 31a and the memory 31b may be connected through a bus or in other manners, for example, connected through a bus in FIG. 9.

As a non-volatile computer-readable storage medium, the memory 31b may be configured to store a non-volatile software program, a non-volatile computer-executable program, and a module, for example, program instructions/modules (for example, the target image region obtaining module 801, the first target location obtaining module 802, the second target location obtaining module 803, the second image location obtaining module 804, the initialization module 805, and the recursion module 806 shown in FIG. 8a) corresponding to the target state estimation method in the embodiments of the present application. The processor 31a runs the non-volatile software program, instructions and modules stored in the memory 31b, to implement various functional applications and data processing of the controller, that is, to implement the target state estimation method in the foregoing method embodiments.

The memory 31b may include a program storage area and a data storage area. The program storage area may store an operating system and an application program that is required for at least one function. The data storage area may store data created according to use of a controller. In addition, the memory 31b may include a high-speed random access memory, and may also include a nonvolatile memory, for example, at least one magnetic disk storage device, a flash memory, or another non-volatile solid-state storage device. In some embodiments, the memory 31*b* optionally includes memories remotely disposed relative to the processor 31*a*, and these remote memories may be connected to the controller through a network. The foregoing examples of the network include, but are not limited to, the Internet, an intranet, a local area network, a mobile communication network, and a combination thereof.

The one or more modules are stored in the memory 31*b*, and perform, when executed by the one or more processors 31*a*, the target state estimation method in any of the foregoing method embodiments, for example, perform the method steps 101 to 106 in FIG. 3*a*, the method steps 1021 and 1022 in FIG. 4, the method step 1031 in FIG. 6, and the method step 1041 in FIG. 7 described above; and implement the functions of the modules 801 to 806 in FIG. 8*a*.

The foregoing product may perform the method provided in the embodiments of the present application, and has the corresponding functional modules for performing the method and beneficial effects thereof. For technical details not described in detail in this embodiment, reference may be made to the method provided in the embodiments of the present application.

An embodiment of the present application provides a non-volatile computer-readable storage medium, storing computer-executable instructions. The computer-executable instructions are executed by one or more processors, for example, the processor 31*a* in FIG. 9, so that the one or more processors may perform the target state estimation method in any of the foregoing method embodiments, for example, perform the method steps 101 to 106 in FIG. 3*a*, the method steps 1021 and 1022 in FIG. 4, the method step 1031 in FIG. 6, and the method step 1041 in FIG. 7 described above; and implement the functions of the modules 801 to 806 in FIG. 8*a*.

The foregoing described apparatus embodiments are merely examples. The units described as separate parts may or may not be physically separate, and the parts displayed as units may or may not be physical units, may be located in one position, or may be distributed on a plurality of network units. Some or all of the modules may be selected according to actual needs to achieve the objectives of the solutions of the embodiments.

Through the description of the foregoing embodiments, a person of ordinary skill in the art may clearly understand that the embodiments may be implemented by software in combination with a universal hardware platform, and may certainly be implemented by hardware. A person of ordinary skill in the art may understand that, all or some of the processes of the method in the foregoing embodiments may be implemented by a computer program instructing relevant hardware. The program may be stored in a computer-readable storage medium. During execution of the program, the processes of the foregoing method embodiments may be included. The foregoing storage medium may be a magnetic disk, an optical disc, a read-only memory (ROM), a random access memory (RAM), or the like.

Finally, it should be noted that the foregoing embodiments are merely used for describing the technical solutions of the present invention, but are not intended to limit the present invention. Under the ideas of the present invention, the technical features in the foregoing embodiments or different embodiments may also be combined, the steps may be performed in any order, and many other changes of different aspects of the present invention also exists as described above. These changes are not provided in detail for simplicity. It should be understood by a person of ordinary skill in the art that although the present invention has been described in detail with reference to the foregoing embodiments, modifications can be made to the technical solutions described in the foregoing embodiments, or equivalent replacements can be made to some technical features in the technical solutions. These modifications or replacements will not cause the essence of corresponding technical solutions to depart from the scope of the technical solutions in the embodiments of the present invention.

What is claimed is:

1. A target state estimation method, applicable to an unmanned aerial vehicle (UAV), the UAV comprising a camera apparatus, wherein the method comprises:
   obtaining a target image acquired by the camera apparatus, and performing image recognition on the target image, to obtain a target image region of a target in the target image;
   obtaining a raw point cloud of a surrounding environment of the UAV, and obtaining a first target location according to the target image region and the raw point cloud;
   obtaining attitude information of the camera apparatus, obtaining a first image location based on the target image region, and obtaining a second target location according to the first image location and the attitude information;
   obtaining a second image location based on the target image region;
   initializing a target state according to the first target location or the second target location; and
   using the first target location and/or the second target location and/or the second image location as measured values of an extended Kalman filter to obtain the target state,
   the target image being a two-dimensional image, and the first image location and the second image location being both locational representations of the target image region in the target image, wherein the attitude information is a pitch angle of the camera apparatus; and
   the obtaining attitude information of the camera apparatus, obtaining a first image location based on the target image region, and obtaining a second target location according to the first image location and the attitude information comprises:
   obtaining the pitch angle of the camera apparatus and if the pitch angle is less than or equal to a preset angle threshold, obtaining the first image location based on the target image region, and obtaining the second target location according to the first image location, the pitch angle, and a geometric relationship between the target and the camera apparatus.

2. A target state estimation method, applicable to an unmanned aerial vehicle (UAV), the UAV comprising a camera apparatus, wherein the method comprises:
   obtaining a target image acquired by the camera apparatus, and performing image recognition on the target image, to obtain a target image region of a target in the target image;
   obtaining attitude information of the camera apparatus, obtaining a first image location based on the target image region, and obtaining a second target location according to the first image location and the attitude information;
   obtaining a second image location based on the target image region;

initializing a target state according to the second target location; and using the second target location and/or the second image location as measured values of an extended Kalman filter to obtain the target state, the target image being a two-dimensional image, and the first image location and the second image location being both locational representations of the target image region in the target image, wherein the attitude information is a pitch angle of the camera apparatus; and the obtaining attitude information of the camera apparatus, obtaining a first image location based on the target image region, and obtaining a second target location according to the first image location and the attitude information comprises:

obtaining the pitch angle of the camera apparatus and if the pitch angle is less than or equal to a preset angle threshold, obtaining the first image location based on the target image region, and obtaining the second target location according to the first image location, the pitch angle, and a geometric relationship between the target and the camera apparatus.

3. The method according to claim 1, wherein the obtaining a first target location according to the target image region and the raw point cloud comprises:

converting the raw point cloud to an image coordinate system where the target image is located, to obtain an image point cloud corresponding to the raw point cloud; and determining whether there is an image point cloud corresponding to the target, the image point cloud corresponding to the target being an image point cloud located in the target image region, and if there is an image point cloud corresponding to the target, obtaining the first target location according to the image point cloud corresponding to the target.

4. The method according to claim 1, wherein the obtaining a second image location based on the target image region comprises:

obtaining the second image location based on the target image region if a ratio of a size of the target image region to a size of the target image is greater than or equal to a preset ratio threshold.

5. The method according to claim 3, wherein the target image region is a minimum bounding box of the target in the target image; and the image point cloud corresponding to the target is an image point cloud whose coordinates are located in the minimum bounding box among image point clouds.

6. The method according to claim 3, wherein the obtaining the first target location according to the image point cloud corresponding to the target comprises:

obtaining a distance and a height of the target relative to the UAV according to world coordinates of the image point cloud corresponding to the target.

7. The method according to claim 1, wherein the first image location is a highest point and a lowest point of the minimum bounding box of the target in the target image; and the obtaining the second target location according to the first image location, the pitch angle, and a geometric relationship between the target and the camera apparatus comprises:

obtaining the second target location according to the geometric relationship between the target and the camera apparatus based on a vertical coordinate $v_{min}$ of the highest point, a vertical coordinate $v_{max}$ of the lowest point, a preset height M of the target, and the pitch angle.

8. The method according to claim 7, wherein the obtaining the second target location according to the geometric relationship between the target and the camera apparatus based on a vertical coordinate $v_{min}$ of the highest point, a vertical coordinate $v_{max}$ of the lowest point, a preset height M of the target, and the pitch angle comprises:

obtaining an angle β between a line connecting the lowest point and an optical center of the camera apparatus and an optical axis of the camera apparatus according to the vertical coordinate $v_{max}$ of the lowest point;

obtaining an angle α between a line connecting the highest point and the optical center of the camera apparatus and the optical axis of the camera apparatus according to the vertical coordinate $v_{min}$ of the highest point;

obtaining an angle δ between the line connecting the highest point and the optical center of the camera apparatus and the line connecting the lowest point and the optical center of the camera apparatus according to the angle β and the angle α, wherein φ=β−α;

obtaining an angle δ between the line connecting the lowest point and the optical center of the camera apparatus and a vertical direction according to the angle β and the pitch angle θ of the camera apparatus, wherein $$\delta = \frac{\pi}{2} - \theta - \beta;$$

and obtaining a distance and a height of the target relative to the UAV according to the angle δ, the angle φ, the preset height M, and the geometric relationship.

9. The method according to claim 8, wherein the obtaining a distance and a height of the target relative to the UAV according to the angle δ, the angle φ, the preset height M, and the geometric relationship comprises:

obtaining a length $L_2$ of the line connecting the lowest point and the optical center of the camera apparatus, and a length $L_2$ of the line connecting the highest point and the optical center of the camera apparatus through the following binary equations:

$$L_1^2 + L_2^2 - 2L_1 L_2 \cos \varphi = M^2, \text{ and}$$

$$M \cos \delta + L_1 \cos \varphi = L_2;$$

calculating the distance d of the target relative to the UAV through a formula $d = L_2 \sin \delta$; and calculating the height h of the target relative to the UAV through a formula $h = L_1 \cos(\varphi + \delta)$.

10. The method according to claim 8, wherein the obtaining an angle between a line connecting the lowest point and an optical center of the camera apparatus and an optical axis of the camera apparatus according to the vertical coordinate $v_{max}$ of the lowest point comprises:

calculating the angle β through the following formula:

$$\delta = \tan^{-1}(v_{max} - c_y)/f_y,$$

$c_y$ being a vertical coordinate of a principal point of the camera apparatus, and $f_y$ being a focal length of the camera apparatus in a y-axis direction; and the obtaining an angle α between a line connecting the highest point and the optical center of the camera apparatus and the optical axis of the camera apparatus according to the vertical coordinate $v_{min}$ of the highest point comprises:
calculating the angle α through the following formula:

$$\alpha = \tan^{-1}{(v_{max}-c_y)}/{f_y}.$$

11. The method according to claim 1, wherein the target image region is a minimum bounding box of the target in the target image, and the second image location is center coordinates of the minimum bounding box.

12. The method according to claim 1, wherein the initializing a target state according to the first target location or the second target location comprises:
  determining whether the first target location is obtained; and
  initializing the target state according to the first target location if the first target location is obtained, and
  initializing the target state according to the second target location if the first target location is not obtained.

13. The method according to claim 1, wherein the using the first target location and/or the second target location and/or the second image location as measured values of an extended Kalman filter to obtain the target state comprises:
  when the first target location, the second target location, and the second image location are obtained, using the first target location, the second target location, and the second image location as measured values of the extended Kalman filter in any order, and updating computation of the extended Kalman filter, to finally obtain the target state;
  when any two of the first target location, the second target location, and the second image location are obtained, using the any two of the first target location, the second target location, and the second image location as measured values of the extended Kalman filter in any order, and updating computation of the extended Kalman filter, to finally obtain the target state; and
  when only one of the first target location, the second target location, or the second image location is obtained, using the one of the first target location, the second target location, and the second image location as a measured value of the extended Kalman filter, to finally obtain the target state.

14. The method according to claim 13, wherein the extended Kalman filter comprises a prediction stage and an update stage;
  in the update stage, the first target location and/or the second target location and/or the second image location are used as measured values of the extended Kalman filter, and an update equation is updated, to obtain an updated value; and
  in the prediction stage, the updated value obtained in the update stage is substituted into a prediction equation of the prediction stage to obtain the target state.

15. An unmanned aerial vehicle (UAV), comprising a body, arms connected to the body, a power system disposed on the arm, and a tracking system disposed on the body, the tracking system comprising a controller, the controller comprising:
  at least one processor; and
  a memory communicatively connected to the at least one processor,
  the memory storing instructions executable by the at least one processor, the instructions being executed by the at least one processor, to cause the at least one processor to be capable of performing:
    obtaining a target image acquired by the camera apparatus, and performing image recognition on the target image, to obtain a target image region of a target in the target image;
    obtaining a raw point cloud of a surrounding environment of the UAV, and obtaining a first target location according to the target image region and the raw point cloud;
    obtaining attitude information of the camera apparatus, obtaining a first image location based on the target image region, and obtaining a second target location according to the first image location and the attitude information;
    obtaining a second image location based on the target image region;
    initializing a target state according to the first target location or the second target location; and
    using the first target location and/or the second target location and/or the second image location as measured values of an extended Kalman filter to obtain the target state,
  the target image being a two-dimensional image, and the first image location and the second image location being both locational representations of the target image region in the target image, wherein the attitude information is a pitch angle of the camera apparatus; and
  the obtaining attitude information of the camera apparatus, obtaining a first image location based on the target image region, and obtaining a second target location according to the first image location and the attitude information comprises:
    obtaining the pitch angle of the camera apparatus and if the pitch angle is less than or equal to a preset angle threshold, obtaining the first image location based on the target image region, and obtaining the second target location according to the first image location, the pitch angle, and a geometric relationship between the target and the camera apparatus.

16. An unmanned aerial vehicle (UAV), comprising a body, arms connected to the body, a power system disposed on the arm, and a tracking system disposed on the body, the tracking system comprising a controller, the controller comprising:
  at least one processor; and
  a memory communicatively connected to the at least one processor,
  the memory storing instructions executable by the at least one processor, the instructions being executed by the at least one processor, to cause the at least one processor to be capable of performing:
    obtaining a target image acquired by the camera apparatus, and performing image recognition on the target image, to obtain a target image region of a target in the target image;
    obtaining attitude information of the camera apparatus, obtaining a first image location based on the target image region, and obtaining a second target location according to the first image location and the attitude information;
    obtaining a second image location based on the target image region;
    initializing a target state according to the second target location; and
    using the second target location and/or the second image location as measured values of an extended Kalman filter to obtain the target state, the target image being a two-dimensional image, and the first image location and the second image location being both locational representations of the target image region in the target image, wherein the attitude information is a pitch angle of the camera apparatus; and the obtaining attitude information of the camera apparatus, obtaining a first image location based on the target image region, and obtaining a second target location according to the first image location and the attitude information comprises:

obtaining the pitch angle of the camera apparatus and if the pitch angle is less than or equal to a preset angle threshold, obtaining the first image location based on the target image region, and obtaining the second target location according to the first image location, the pitch angle, and a geometric relationship between the target and the camera apparatus.

17. A non-transitory computer readable memory medium storing program instructions executable by processing circuitry to cause a processor to:

obtain a target image acquired by the camera apparatus, and performing image recognition on the target image, to obtain a target image region of a target in the target image;

obtain a raw point cloud of a surrounding environment of the UAV, and obtaining a first target location according to the target image region and the raw point cloud;

obtain attitude information of the camera apparatus, obtaining a first image location based on the target image region, and obtaining a second target location according to the first image location and the attitude information;

obtain a second image location based on the target image region;

initialize a target state according to the first target location or the second target location; and use the first target location and/or the second target location and/or the second image location as measured values of an extended Kalman filter to obtain the target state, the target image being a two-dimensional image, and the first image location and the second image location being both locational representations of the target image region in the target image, wherein the attitude information is a pitch angle of the camera apparatus; and the obtaining attitude information of the camera apparatus, obtaining a first image location based on the target image region, and obtaining a second target location according to the first image location and the attitude information comprises:

obtaining the pitch angle of the camera apparatus and if the pitch angle is less than or equal to a preset angle threshold, obtaining the first image location based on the target image region, and obtaining the second target location according to the first image location, the pitch angle, and a geometric relationship between the target and the camera apparatus.

18. A non-transitory computer readable memory medium storing program instructions executable by processing circuitry to cause a processor to:

obtain a target image acquired by the camera apparatus, and performing image recognition on the target image, to obtain a target image region of a target in the target image;

obtain attitude information of the camera apparatus, obtaining a first image location based on the target image region, and obtaining a second target location according to the first image location and the attitude information;

obtain a second image location based on the target image region;

initialize a target state according to the second target location; and use the second target location and/or the second image location as measured values of an extended Kalman filter to obtain the target state, the target image being a two-dimensional image, and the first image location and the second image location being both locational representations of the target image region in the target image, wherein the attitude information is a pitch angle of the camera apparatus; and the obtaining attitude information of the camera apparatus, obtaining a first image location based on the target image region, and obtaining a second target location according to the first image location and the attitude information comprises:

obtaining the pitch angle of the camera apparatus and if the pitch angle is less than or equal to a preset angle threshold, obtaining the first image location based on the target image region, and obtaining the second target location according to the first image location, the pitch angle, and a geometric relationship between the target and the camera apparatus.

* * * * *